(12) United States Patent  
Son

(10) Patent No.: US 8,795,925 B2  
(45) Date of Patent: Aug. 5, 2014

(54) FUEL COMPOSITION FOR POLYMER ELECTROLYTE FUEL CELL AND POLYMER ELECTROLYTE FUEL CELL SYSTEM INCLUDING SAME

(75) Inventor: In-Hyuk Son, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1030 days.

(21) Appl. No.: 11/979,628

(22) Filed: Nov. 6, 2007

(65) Prior Publication Data

US 2008/0311447 A1    Dec. 18, 2008

(30) Foreign Application Priority Data

Jun. 15, 2007 (KR) .................... 10-2007-0058906

(51) Int. Cl.
| | |
|---|---|
| *H01M 8/22* | (2006.01) |
| *H01M 8/04* | (2006.01) |
| *H01M 8/10* | (2006.01) |
| *H01M 8/06* | (2006.01) |
| *C10L 1/12* | (2006.01) |
| *C10L 1/18* | (2006.01) |

(52) U.S. Cl.
CPC ........... *H01M 8/0618* (2013.01); *C10L 1/1258* (2013.01); *C10L 1/1283* (2013.01); *C10L 1/1291* (2013.01); *H01M 2008/1095* (2013.01)  
USPC ........... 429/505; 429/513; 429/492; 429/483; 44/457

(58) Field of Classification Search
CPC ............... C10L 1/00; C10L 1/02; C10L 1/04; C10L 1/1233; C10L 1/258; C10L 1/1283; C10L 1/1291; C10L 1/16; H01M 8/06–8/0612  
USPC ......... 429/479, 483, 491, 492, 502, 505, 506, 429/512, 513; 44/300, 457  
See application file for complete search history.

(56) References Cited

U.S. PATENT DOCUMENTS

| | | | |
|---|---|---|---|
| 7,829,052 | B2 | 11/2010 | Xiao |
| 8,142,954 | B2 | 3/2012 | Lee et al. |
| 2003/0124405 | A1* | 7/2003 | Rock .............................. 429/34 |

(Continued)

FOREIGN PATENT DOCUMENTS

| | | | |
|---|---|---|---|
| JP | 2002343403 A | * | 11/2002 |
| KR | 10-2006-0132893 A | | 12/2006 |
| KR | 10-0723388 B1 | | 5/2007 |

OTHER PUBLICATIONS

Derwent Abstract for Tezuka et al., JP 2002-343403 A.*

(Continued)

*Primary Examiner* — Edu E Enin-Okut  
(74) *Attorney, Agent, or Firm* — Robert E. Bushnell, Esq.

(57) ABSTRACT

The fuel composition for a fuel cell for a polymer electrolyte membrane fuel cell includes a fuel, water, hydrogen peroxide ($H_2O_2$), and heteropoly acid. The fuel may be a hydrocarbon fuel. The hydrogen peroxide may be present in an amount of 10 wt % to 60 wt % based on the weight of the mixture of the fuel, water, and the hydrogen peroxide. The heteropoly acid may be present in an amount of 0.0001 parts to 5 parts by weight based on 100 parts by weight of a mixture of the fuel, water, and hydrogen peroxide. The fuel composition may reduce a reforming reaction temperature and also hydrogen generating efficiency and resultantly provides a high power cell.

14 Claims, 1 Drawing Sheet

(56) References Cited

U.S. PATENT DOCUMENTS

| | | | |
|---|---|---|---|
| 2005/0031918 A1* | 2/2005 | Barber et al. | 429/17 |
| 2006/0024539 A1* | 2/2006 | Dumesic et al. | 429/17 |
| 2006/0165576 A1* | 7/2006 | Lee et al. | 423/247 |
| 2007/0122665 A1* | 5/2007 | Lee et al. | 429/13 |

OTHER PUBLICATIONS

Machine translation for Tezuka et al., JP 2002-343403 A.*

Zhizhina et al., "Oxidation of CO to CO2 by Heteropolyacids in the Presence of Palladium", Journal of Molecular Catalysis, 38 (1986) 345-353.*

E. G Zhizhina et al., Oxidation of CO to CO2 by Heteropolyacids in the Presence of Palladium, Journal of Molecular Catalysis, vol. 38, pp. 345-353, cited in the Korean OA issued by KIPO on Oct. 31, 2013, which corresponds to KR10-2007-0058906.

Korean OA issued by KIPO on Oct. 31, 2013, which corresponds to KR10-2007-0058906 and Request for Entry of the Accompanying Office Action attached herewith.

Notice of Allowance issued by KIPO dated Apr. 30, 2014 corresponding to KR 10-2007-0058906 and Request for Entry of the Accompanying Notice of Allowance attached herewith.

* cited by examiner

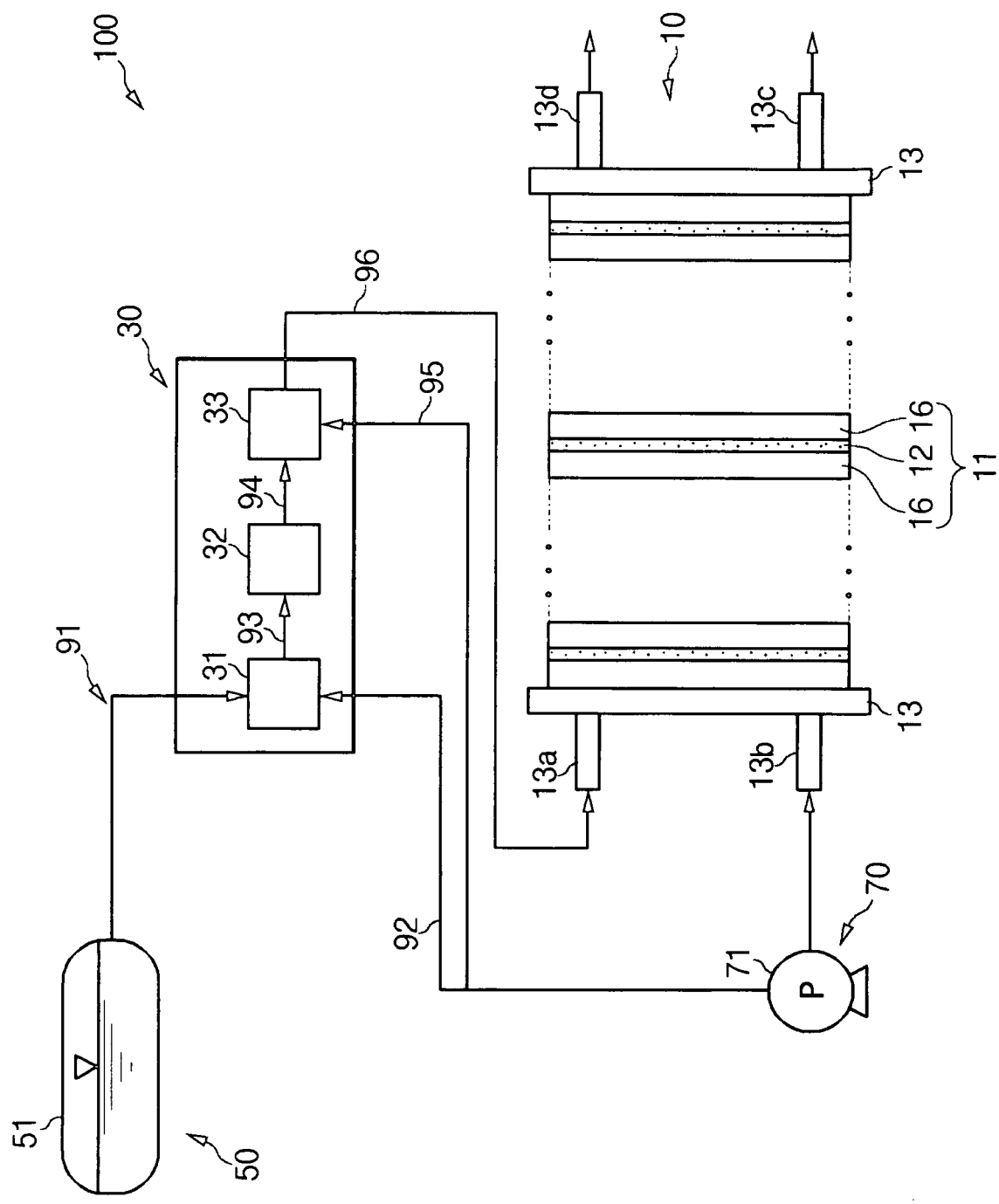

FUEL COMPOSITION FOR POLYMER ELECTROLYTE FUEL CELL AND POLYMER ELECTROLYTE FUEL CELL SYSTEM INCLUDING SAME

CLAIM OF PRIORITY

This application makes reference to, incorporates the same herein, and claims all benefits accruing under 35 U.S.C. §119 from an application for FUEL COMPOSITION FOR POLYMER ELECTROLYTE FUEL CELL POLYMER ELECTROLYTE FUEL CELL SYSTEM INCLUDING SAME earlier filed in the Korean Intellectual Property Office on the 15 Jun. 2007 and there duly assigned Ser. No. 10-2007-0058906.

BACKGROUND OF THE INVENTION

1. Field of the Invention

The present invention relates to a fuel composition for a polymer electrolyte membrane fuel cell and a fuel cell system including the same. More particularly, the present invention relates to a fuel composition for a fuel cell capable of providing a high power cell and fuel cell system including the same.

2. Description of the Related Art

A fuel cell is a power generation system for producing electrical energy through an electrochemical redox reaction of an oxidant and a fuel such as hydrogen, or a hydrocarbon-based material such as methanol, ethanol, natural gas, and the like.

Such a fuel cell is a clean energy source that may replace fossil fuels. It includes a stack composed of unit cells and produces various ranges of power output. Since it has a four to ten times higher energy density than a small lithium battery, it has been highlighted as a small portable power source.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte fuel cell has an advantage of a high energy density and high power. In the above-mentioned fuel cell, a stack that generates electricity substantially includes several to scores of unit cells stacked adjacent to one another, and each unit cell is formed of a membrane-electrode assembly (MEA) and a separator (also referred to as a bipolar plate).

The membrane-electrode assembly is composed of an anode (also referred to as a "fuel electrode" or an "oxidation electrode") and a cathode (also referred to as an "air electrode" or a "reduction electrode") that are separated by a polymer electrolyte membrane. A fuel is supplied to an anode and adsorbed on catalysts of the anode, and the fuel is oxidized to produce protons and electrons. The electrons are transferred into a cathode via an external circuit, and the protons are transferred into the cathode through the polymer electrolyte membrane.

In addition, an oxidant is supplied to the cathode, and then the oxidant, protons, and electrons are reacted on catalysts of the cathode to produce electricity along with water.

SUMMARY OF THE INVENTION

One embodiment of the present invention provides a fuel composition for a polymer electrolyte membrane fuel cell being capable of providing a high power cell.

Another embodiment of the present invention provides a polymer electrolyte membrane fuel cell system including the fuel composition.

According to an embodiment of the present invention, provided is a fuel composition for a polymer electrolyte membrane fuel cell that includes a fuel, water, hydrogen peroxide ($H_2O_2$), and heteropoly acid.

The $H_2O_2$ is present in an amount of 10 to 60 wt % based on the weight of the mixture of the fuel, the water, the hydrogen peroxide, and the heteropoly acid. According to one embodiment of the present invention, $H_2O_2$ is present in an amount of 25 to 35 wt %.

In particular, the $H_2O_2$ may be included in a various amount depending on the kind of a fuel. The ratio of the number of carbon in the fuel to the number of oxygen generated from hydrogen peroxide ranges from 0.2 to 1.2. However, it may ranges from 0.5 to 0.8 according to another embodiment of the present invention.

The fuel can be a hydrocarbon fuel.

The heteropoly acid includes compounds including at least one anion selected from the group consisting of $[PMo_{12}O_{40}]^{3-}$, $[PW_{12}O_{40}]^{3-}$, $[GeMo_{12}O_{40}]^{4-}$, $[GeW_{12}O_{40}]^{4-}$, $[P_2W_{18}O_{62}]^{6-}$, $[SiW_{12}O_{40}]^{4-}$, $[PMo_{11}O_{39}]^{7-}$, $[P_2Mo_5O_{23}]^{6-}$, $[H_2W_{12}O_{40}]^{6-}$, $[PW_{11}O_{39}]^{7-}$, and combinations thereof.

Herein, the heteropoly acid is included in an amount of 0.0001 to 5 parts by weight based on 100 parts by weight of a mixture of a fuel, water, and $H_2O_2$. According to one embodiment, the heteropoly acid is included in an amount of 0.001 to 1 parts by weight based on 100 parts by weight of a mixture of a fuel, water, and $H_2O_2$.

According to another embodiment of the present invention, provided is a polymer electrolyte membrane fuel cell system that includes a fuel supplier for supplying a fuel composition that includes a fuel, water, hydrogen peroxide ($H_2O_2$), and heteropoly acid, a reformer that reforms the fuel composition to generate hydrogen gas, at least one electricity generating element including a membrane-electrode assembly and a separator and generating electricity through electrochemical reactions of the hydrogen gas and an oxidant, and an oxidant supplier for supplying an oxidant to the electricity generating element. The membrane-electrode assembly includes an anode and a cathode facing each other and a polymer electrolyte membrane interposed therebetween.

BRIEF DESCRIPTION OF THE DRAWING

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 schematically shows the structure of a polymer electrolyte membrane fuel cell system constructed as one embodiment of the present invention.

DETAILED DESCRIPTION OF THE INVENTION

The present invention relates to a fuel composition for a fuel cell for a polymer electrolyte membrane fuel cell including a fuel, water, hydrogen peroxide ($H_2O_2$), and heteropoly acid. In the present specification, the fuel composition is a kind of fuel supplied to a reformer of a fuel cell.

The $H_2O_2$ is present in an amount of 10 to 60 wt % based on the weight of the mixture of the fuel, the water, the $H_2O_2$, and the heteropoly acid. According to one embodiment of the present invention, $H_2O_2$ is present in an amount of 25 to 35 wt %.

When the $H_2O_2$ is in the above range, a reformer may be operated at a low temperature. In particular, the $H_2O_2$ may be included in a various amount depending on the kind of a fuel. The ratio of the number of carbon in the fuel to the number of oxygen generated from hydrogen peroxide ranges from 0.2 to 1.2. It may be in the range of 0.5 to 0.8 according to another embodiment.

The number of carbon is 2 when ethanol ($C_2H_5OH$) is used as a fuel. The number of oxygen is a number of oxygen that is produced from 1 mol of hydrogen peroxide. In other words, the number of oxygen is 1 that corresponds to ½ of the hydrogen peroxide.

When a fuel and hydrogen peroxide are used to include carbon and oxygen in the aforementioned ratio, they may improve reforming reaction performance due to the hydrogen peroxide.

The heteropoly acid includes compounds including at least one anion selected from the group consisting of $[PMo_{12}O_{40}]^{3-}$, $[PW_{12}O_{40}]^{3-}$, $[GeMo_{12}O_{40}]^{4-}$, $[GeW_{12}O_{40}]^{4-}$, $[P_2W_{18}O_{62}]^{6-}$, $[SiW_{12}O_{40}]^{4-}$, $[PMo_{11}O_{39}]^{7-}$, $[P_2Mo_5O_{23}]^{6-}$, $[H_2W_{12}O_{40}]^{6-}$, $[PW_{11}O_{39}]^{7-}$ and combinations thereof. For a cation of the heteropoly acid, $H^+$ may be coupled with the anion. The heteropoly acid has high electronic and proton conductivity and an economical and harmless material. When it is used in a reforming fuel composition, it may perform reforming reactions at a low temperature and thereby reduce a reaction temperature of a reformer and increase hydrogen generating efficiency.

In a fuel composition including only $H_2O_2$, water, and a fuel, $H_2O_2$ exists in a unstable state and may be decomposed by ultraviolet rays or at low temperature. On the contrary, the heteropoly acid stabilizes $H_2O_2$, and suppresses $H_2O_2$ decomposition. The heteropoly acid also activates a reforming catalyst reaction of a reformer.

The heteropoly acid may be included in an amount of 0.0001 to 5 parts by weight based on 100 parts by weight of a mixture of a fuel, water, and $H_2O_2$. According to one embodiment, the heteropoly acid is included in an amount of 0.001 to 1 parts by weight based on 100 parts by weight of a mixture of a fuel, water, and $H_2O_2$.

When the heteropoly acid is included in an amount of less than 0.0001 parts by weight, it may have little effects. On the contrary, when it is included in an amount of more than 5 parts by weight, it may relatively reduce fuel concentration, resulting in deteriorating energy density.

In the fuel composition, the fuel and water may be controlled in an appropriate amount.

The fuel includes gas or liquid hydrocarbon fuel such as methanol, ethanol, propanol, butanol, or natural gas.

The fuel composition further includes a hydrocarbon stability agent. The hydrocarbon stability agent may be, but not limited to, ethylene glycol phenyl ether. The hydrocarbon stability agent may repress the inherent property of the hydroperoxide, which may be decomposed.

The hydrocarbon stability agent may be included in an amount of 1 to 0.001 parts (1% to 10ppm) by weight based on 100 parts by weight of the fuel composition. According to one embodiment, the hydrocarbon stability agent may be included in an amount of 0.1 to 0.01 parts (1000 to 100 ppm) parts by weight based on 100 parts by weight of the fuel composition. The amount within the range gives the sufficient effect by use the hydrocarbon stability agent, and does not cause the side product, such as $CH_4$.

The fuel composition may appropriately be applicable to a polymer electrolyte membrane fuel cell system. The polymer electrolyte membrane fuel cell system according to another embodiment includes a fuel supplier, a reformer, an electricity generating element, and an oxidant supplier.

The fuel supplier plays a role of providing a fuel composition, which includes including a fuel, water, $H_2O_2$, and heteropoly acid, for the electricity generating element. The reformer reforms the fuel composition to generate hydrogen gas. An oxidant such as air or oxygen is supplied to the electricity generating element. The electricity generating element includes a membrane-electrode assembly including an anode and a cathode facing each other and a polymer electrolyte membrane interposed therebetween, and separators. Such an electricity generating element generates electricity through electrochemical reactions of the hydrogen gas supplied from the reformer, and an oxidant.

The cathode and anode are respectively composed of an electrode substrate and a catalyst layer. The catalyst layer includes any catalyst that may perform a fuel cell reaction.

Examples of the catalyst include a platinum-based catalyst. The platinum-based catalyst may include at least one selected from the group consisting of platinum, ruthenium, osmium, platinum-ruthenium alloys, platinum-osmium alloys, platinum-palladium alloys, platinum-M alloys (where M is a transition element selected from the group consisting of Ga, Ti, V, Cr, Mn, Fe, Co, Ni, Cu, Zn, Sn, Mo, W, Rh, Ru, and combinations thereof), and combinations thereof. Representative examples of the catalysts include at least one selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

Such a metal catalyst may be used in a form of a metal itself (black catalyst), or one supported on a supporter. The supporter may include a carbon-based material such as graphite, denka black, ketjen black, acetylene black, carbon nanotube, carbon nano fiber, carbon nano wire, carbon nano ball, activated carbon, or so on, or an inorganic material particulate such as alumina, silica, zirconia, titania, or so on. The carbon-based material is generally used. When the catalyst includes a noble metal supported in on a supporter, it may include any one available in the market or one prepared by carrying a noble metal on a supporter. The process for supported a noble metal on a supporter is well known to those skilled in the art, so the details will be omitted from this detailed description.

The catalyst layer may further include a binder resin having ion conductivity to improve adherence to the polymer electrolyte membrane and the proton transferring property.

The binder resin may be a proton conductive polymer resin having a cation exchange group selected from the group consisting of a sulfonic acid group, a carboxylic acid group, a phosphoric acid group, a phosphonic acid group, and derivatives thereof at its side chain. Non-limiting examples of the polymer include at least one proton conductive polymers selected from the group consisting of perfluoro-based polymers, benzimidazole-based polymers, polyimide-based polymers, polyetherimide-based polymers, polyphenylene-sulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly (2,5-benzimidazole).

H may be substituted with Na, K, Li, Cs, or tetrabutyl ammonium in a proton conductive group of the proton conductive polymer. When H is substituted with Na in an ion exchange group at the terminal end of the proton conductive group, NaOH is used. When H is substituted with tetrabutyl ammonium, tributyl ammonium hydroxide is used. K, Li, or Cs may also be substituted by using appropriate compounds. A method of substituting H is known in this related art, and thereby is not further described in detail.

The binder resin may be used singularly or as a mixture. Optionally, the binder resin may be used along with a non-conductive polymer to improve adherence between a polymer electrolyte membrane and the catalyst layer. The amount of the binder resin may be adjusted to its usage purpose. Non-limiting examples of the non-conductive polymer include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE), ethylenechlorotrifluoro-ethylene copolymers (ECTFE), polyvinylidene fluoride, polyvinylidene fluoride-hexafluoropropylene copolymers (PVdF-HFP), dodecyl benzene sulfonic acid, sorbitol, and combinations thereof.

The electrode substrate supports the electrode, and provides a path for transferring fuel and an oxidant to the catalyst. In one embodiment, the electrode substrates are formed from a material such as carbon paper, carbon cloth, carbon felt, or a metal cloth (a porous film composed of metal fiber or a metal film disposed on a surface of a cloth composed of polymer fibers). The electrode substrate is not limited thereto.

The electrode substrates may be treated with a fluorine-based resin to be water-repellent to prevent deterioration of diffusion efficiency due to water generated during operation of a fuel cell. The fluorine-based resin may include polytetrafluoroethylene, polyvinylidene fluoride, polyhexafluoro propylene, polyperfluoroalkylvinylether, polyperfluoro sulfonylfluoride alkoxyvinyl ether, fluorinated ethylene propylene, polychlorotrifluoro ethylene, or copolymers thereof, but is not limited thereto.

A microporous layer (MPL) may be added between the aforementioned electrode substrate and catalyst layer to increase reactant diffusion effects. The microporous layer generally includes conductive powders with a certain particle diameter. The conductive material may include, but is not limited to, carbon powder, carbon black, acetylene black, ketjen black, activated carbon, carbon fiber, fullerene, nano-carbon, or combinations thereof. The nano-carbon may include a material such as carbon nanotubes, carbon nanofiber, carbon nanowire, carbon nanohoms, carbon nanorings, or combinations thereof.

The microporous layer is formed by coating a composition comprising a conductive powder, a binder resin, and a solvent on the conductive substrate. The binder resin may include, but is not limited to, polytetrafluoro ethylene, polyvinylidene fluoride, polyvinyl alcohol, cellulose acetate, polyhexafluoro propylene, polyperfluoroalkylvinyl ether, polyperfluoro sulfonylfluoride alkoxy vinyl ether, and copolymers thereof. The solvent may include, but is not limited to, an alcohol such as ethanol, isopropylalcohol, n-propylalcohol, butanol, and so on, water, dimethyl acetamide, dimethyl sulfoxide, or N-methylpyrrolidone. The coating method may include, but is not limited to, screen printing, spray coating, doctor blade methods, gravure coating, dip coating, silk screening, painting, and so on, depending on the viscosity of the composition.

The polymer electrolyte membrane of the membrane-electrode assembly may generally include a proton conductive polymer resin. The proton conductive polymer resin may be a polymer resin having a cation exchange group selected from the group consisting of a sulfonic acid group, a carboxylic acid group, a phosphoric acid group, a phosphonic acid group, and derivatives thereof, at its side chain. Non-limiting examples of the polymer resin include at least one selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid) (NAFION™), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bib enzimidazole), and poly(2,5-benzimidazole).

The hydrogen in the proton conductive group of the proton conductive polymer may be replaced with Na, K, Li, Cs, or tetrabutylammonium. When the H in the ionic exchange group of the terminal end of the proton conductive polymer side is substituted with Na or tetrabutylammonium, NaOH or tetrabutylammonium hydroxide may be used during preparation of the catalyst composition, respectively. When the H is substituted with K, Li, or Cs, suitable compounds for the substitutions may be used. Since such a substitution is known to this art, a detailed description thereof is omitted. The polymer electrolyte membrane generally has a thickness ranging from 10 to 200 μm.

FIG. 1 shows a schematic structure of a fuel cell system that will be described in detail with reference to this accompanying drawing as follows. FIG. 1 illustrates a fuel cell system wherein a fuel and an oxidant are provided to the electricity generating element through pumps, but the present invention is not limited to such structures. The fuel cell system of the present invention alternatively includes a structure wherein a fuel and an oxidant are provided in a diffusion manner.

As shown in FIG. 1, the fuel cell system 100 includes a stack including an electricity generating element 11 that generates electrical energy through electrochemical reactions, and a reformer 30 that generates hydrogen gas from a liquid fuel and supplies the hydrogen gas, a fuel supplier 50 for supplying a fuel to the reformer 30, and an oxidant supplier 70 for supplying an oxidant to the reformer 30 and electricity generating element 11, respectively.

The electricity generating element 11 is formed as a minimum unit for generating electricity by disposing a membrane-electrode assembly (MEA) 12 between two separators 16, and then a stack 10 is formed with a stacked structure by arranging a plurality of minimum units. The membrane-electrode assembly 12 includes an anode and a cathode, and performs hydrogen gas oxidation and oxidant reduction reactions. The separators 16 supply hydrogen gas and oxidant through gas passage paths formed at both sides of the membrane-electrode assembly 12, and also function as a conductor connecting the anode and the cathode in series.

As shown in FIG. 1, the stack 10 may additionally include pressing plates 13 for positioning a plurality of the electricity generating elements 11 to be closely adjacent to each other at the outermost ends of the stack 10. However, the stack 10 of a fuel cell according to the present embodiment may be formed by positioning the separators 16 at the outermost ends of the electricity generating element 11 to play a role of pressing the electricity generating elements 11 instead of using the separate pressing plates 13. On the contrary, the pressing plates 13 may be formed to intrinsically function as the separators 16 other than to closely arrange a plurality of electricity generating elements 11.

The pressing plate 13 includes a first inlet 13a to supply hydrogen gas to electricity generating element 11, a second inlet 13b to supply oxidant to the electricity generating element 11 from the oxidant supplier 40, a first outlet 13c to release hydrogen gas remaining after a reaction at the anode of the membrane-electrode assembly 12, and a second outlet 13d to release non-reacted air including moisture generated through a reduction reaction of oxidant at the cathode of the membrane-electrode assembly 12.

The reformer 30 has a structure for generating hydrogen gas from a fuel from chemical catalytic reactions using heat energy and for reducing carbon monoxide concentration in the hydrogen gas. The reformer 30 includes a heat source 31 for commonly generating heat energy through a catalytic oxidation reaction of a fuel and oxidant, a reforming reaction part 32 generating hydrogen gas from the fuel through a steam reforming catalyst reaction by the heat energy, and a carbon monoxide reduction part 33 for reducing the concentration of carbon monoxide included in the hydrogen gas.

The heat source 31 is connected to a fuel tank 51 through a first supply line 91 having a pipe shape and to an oxidant pump 71 through a second supply line 92 having a pipe shape. A liquid fuel flows through the first supply line 91, and oxidant flows through the second supply line 92. The heat source 31 includes a catalyst layer (not shown) that accelerates the oxidation reaction of the fuel with the oxidant to generate the heat energy. Herein, the heat source 31 is formed as a plate that provides a channel (not shown) that is capable of inflowing the liquid fuel and the oxidant. The surface of the channel is coated with the catalyst layer. The heat source 31 is shaped as a cylinder that has a predetermined internal space. The internal space may be filled with a catalyst layer such as a pellet type of catalyst module or a honeycomb type of catalyst module.

The reforming reaction part 32 absorbs the heat energy generated from the heat source 31 to generate the hydrogen gas from the fuel through the steam-reforming catalyst reforming reaction of the fuel supplied from the fuel tank 51. The reforming reaction part 32 is directly connected to the heat source 31 via a third supply line 93. In addition, the reforming reaction part 32 includes a catalyst layer (not shown) for generating the hydrogen gas by accelerating the steam reforming reaction of the fuel. Herein, the heat source 32 includes a channel (not shown) capable of inflowing the fuel. The surface of the channel is coated with the catalyst layer. The heat source 32 is shaped as a cylinder that has a predetermined internal space. The internal space may be filled with a catalyst layer such as a pellet type of catalyst module or a honeycomb type of catalyst module.

The carbon monoxide reduction part 33 reduces carbon monoxide concentration in the hydrogen gas through a preferential CO oxidation catalyst reaction of the hydrogen gas with the oxidant. The hydrogen gas is generated from the reformer reaction part 32 and the air is supplied from the oxidant pump 71. The carbon monoxide reduction part 33 is connected to the reformer reaction part 32 via a fourth supply line 94, and to the oxidant pump 71 via a fifth supply line 95. Thus, the hydrogen gas flows through the fourth supply line 94, and oxidant flows through the fifth supply line 95. The carbon monoxide reduction part 33 may include a catalyst layer (not shown) including a catalyst. The catalyst accelerates the preferential oxidation reaction to reduce the carbon monoxide concentration included in the hydrogen gas. Herein, the carbon monoxide reduction part 33 includes a channel (not shown) that is capable of inflowing the fuel. The surface of the channel is coated with the catalyst layer. The carbon monoxide reduction part 33 is shaped as a cylinder that has a predetermined internal space. The internal space may be filled with a catalyst layer such as a pellet type of catalyst module or a honeycomb type of catalyst module.

Herein, the carbon monoxide reduction part 33 is connected to the first inlet 13a of the stack 10 via a sixth supply line 96. It provides the electricity generating element 11 of the stack 10 with the hydrogen gas in which the carbon monoxide concentration is reduced through the carbon monoxide reduction part 33. In addition, the carbon monoxide reduction part 33 may include thermally conductive stainless steel, aluminum, copper, iron, and so on.

The following examples illustrate the present invention in more detail. However, it is understood that the present invention is not limited by these examples.

EXAMPLE 1

88 wt % of Pt—Ru black (Johnson Matthey) and Pt black (Johnson Matthey) catalysts was respectively mixed with 12 wt % of NAFION/$H_2O$/2-propanol (having a concentration of 5 wt %, Solution Technology Inc.) to prepare an anode catalyst composition and a cathode catalyst composition, respectively. The anode catalyst composition was applied to a carbon paper electrode substrate including 0.2 mg/cm$^2$ carbon to fabricate an anode, and the cathode catalyst composition was applied to a carbon paper electrode substrate including 1.3 mg/cm$^2$ carbon to fabricate a cathode. The anode and cathode respectively included catalysts in a loading amount of 4 mg/cm$^2$.

A unit cell was fabricated using the anode and cathode, and a commercial NAFION 115 (perfluorosulfonic acid) for a polymer electrolyte membrane. Using the unit cell, a polymer electrolyte membrane fuel cell system was made in accordance with a conventional method.

Subsequently, a fuel composition was prepared by mixing 33.5 wt % of ethanol in 25 mol % of a concentration (reagent grade, solvent: water), 57.8 wt % of hydrogen peroxide in 54.3 wt % of $H_2O_2$ concentration (Hansol Co.), 8.7 wt % of water, and adding $H_3PW_{12}O_{40}$ heteropoly acid to the resulting mixture. The fuel composition is supplied to a reformer of a polymer electrolyte fuel cell system for operation.

Herein, the heteropoly acid was included in an amount of 0.1 parts by weight based on 100 parts by weight of a mixture of ethanol, $H_2O_2$, and water.

EXAMPLE 2

A fuel composition is prepared according to the same method as in Example 1 except for including 35.4 wt % of ethanol in 25 mol % of a concentration (reagent grade, solvent: water), 48.7 wt % of hydrogen peroxide in 54.3 wt % of an $H_2O_2$ concentration (Hansol Co.), 15.9 wt % of water, and adding 0.1 parts by weight of $H_3PW_{12}O_{40}$ heteropoly acid based on 100 parts by weight of a mixture of the ethanol, $H_2O_2$, and water to the resulting mixture.

EXAMPLE 3

A fuel composition is prepared according to the same method as in Example 1 μl except for including 37.1 wt % of ethanol in 25 mol % of a concentration (reagent grade, sol vent: water), 41.1 wt % of hydrogen peroxide in 54.3 wt % of $H_2O_2$ concentration (Hansol Co.), 21.8 wt % of water, and 0.1 parts by weight of $H_3PW_{12}O_{40}$ heteropoly acid based on 100 parts by weight of a mixture of the ethanol, $H_2O_2$, and water to the resulting mixture.

EXAMPLE 4

A fuel composition was prepared according to the same method as in Example 1 except for 38.5 wt % of ethanol in 25 mol % of a concentration (reagent grade, solvent: water), 34.7 wt % of hydrogen peroxide in 54.3 wt % of $H_2O_2$ concentration (Hansol Co.), 26.8 wt % of water, and adding 0.1 parts by weight of $H_3PW_{12}O_{40}$ heteropoly acid based on 100 parts by weight of a mixture of the ethanol, $H_2O_2$, and water to the resulting mixture.

EXAMPLE 5

A fuel composition was prepared according to the same method as in Example 1 except for including 39.7 wt % of ethanol in 25 mol % of a concentration (reagent grade, solvent: water), 29.3 wt % of hydrogen peroxide in 54.3 wt % of $H_2O_2$ concentration (Hansol Co.), 31 wt % of water, and adding 0.1 parts by weight of $H_3PW_{12}O_{40}$ heteropoly acid based on 100 parts by weight of a mixture of the ethanol, $H_2O_2$, and water to the resulting mixture.

EXAMPLE 6

A fuel composition was prepared according to the same method as in Example 1 except for including 40.7 wt % of ethanol in 25 mol % of a concentration (reagent grade, solvent: water), 24.6 wt % of hydrogen peroxide in 54.3 wt % of $H_2O_2$ concentration (Hansol Co.), 34.7 wt % of water, and adding 0.1 parts by weight of $H_3PW_{12}O_{40}$ heteropoly acid based on 100 parts by weight of a mixture of the ethanol, $H_2O_2$, and water to the resulting mixture.

EXAMPLE 7

A fuel composition was prepared according to the same method as in Example 1 except for including 41.5 wt % of ethanol in 25 mol % of a concentration (reagent grade, solvent: water), 20.5 wt % of hydrogen peroxide in 54.3 wt % of $H_2O_2$ concentration (Hansol Co.), 38 wt % of water, and adding 0.1 parts by weight of $H_3PW_{12}O_{40}$ heteropoly acid based on 100 parts by weight of a mixture of the ethanol, $H_2O_2$, and water to the resulting mixture.

EXAMPLE 8

A fuel composition was prepared according to the same method as in Example 1 except for 42.3 wt % of ethanol in 25 mol % of a concentration (reagent grade, solvent: water), 16.9 wt % of hydrogen peroxide in 54.3 wt % of $H_2O_2$ concentration (Hansol Co.), 40.8 wt % of water, and adding 0.1 parts by weight of $H_3PW_{12}O_{40}$ heteropoly acid based on 100 parts by weight of a mixture of the ethanol, $H_2O_2$, and water to the resulting mixture.

COMPARATIVE EXAMPLE 1

The polymer electrolyte membrane fuel cell system was fabricated according to the same method as in Example 1, except that a fuel composition did not include $H_3PW_{12}O_{40}$ heteropoly acid.

COMPARATIVE EXAMPLE 2

The polymer electrolyte membrane fuel cell system was fabricated according to the same method as in Example 2, except that a fuel composition did not include $H_3PW_{12}O_{40}$ heteropoly acid.

COMPARATIVE EXAMPLE 3

The polymer electrolyte membrane fuel cell system was fabricated according to the same method as in Example 3, except that a fuel composition did not include $H_3PW_{12}O_{40}$ heteropoly acid.

COMPARATIVE EXAMPLE 4

The polymer electrolyte membrane fuel cell system was fabricated according to the same method as in Example 4, except that a fuel composition did not include $H_3PW_{12}O_{40}$ heteropoly acid.

COMPARATIVE EXAMPLE 5

The polymer electrolyte membrane fuel cell system was fabricated according to the same method as in Example 5, except that a fuel composition did not include $H_3PW_{12}O_{40}$ heteropoly acid.

COMPARATIVE EXAMPLE 6

The polymer electrolyte membrane fuel cell system was fabricated according to the same method as in Example 6, except that a fuel composition did not include $H_3PW_{12}O_{40}$ heteropoly acid.

COMPARATIVE EXAMPLE 7

The polymer electrolyte membrane fuel cell system was fabricated according to the same method as in Example 7, except that a fuel composition did not include $H_3PW_{12}O_{40}$ heteropoly acid.

COMPARATIVE EXAMPLE 8

The polymer electrolyte membrane fuel cell system was fabricated according to the same method as in Example 8, except that a fuel composition did not include $H_3PW_{12}O_{40}$ heteropoly acid.

Then, an ethanol conversion rate and the hydrogen selectivity of the polymer electrolyte membrane fuel cell systems according to Examples 1 to 8 and Comparative Examples 1 to 8 were measured. The results were relatively recalculated against a theoretical value (based on the amount of maximum hydrogen that one mol of ethanol may produce through steam reforming (SR) reaction).

In addition, the following Table 1 also shows a C/O ratio and the amount of $H_2O_2$, $H_2O$, and ethanol used for the polymer electrolyte membrane fuel cell systems according to Examples 1 to 8 and Comparative Examples 1 to 8.

TABLE 1

| | | C/O | | | | | | | |
|---|---|---|---|---|---|---|---|---|---|
| | | 0.6 | 0.7 | 0.8 | 0.9 | 1.0 | 1.1 | 1.2 | 1.3 |
| Weight ratio (%) | $H_2O_2$ | 57.8 | 48.7 | 41.1 | 34.7 | 29.3 | 24.6 | 20.5 | 16.9 |
| | $H_2O$ | 8.7 | 15.9 | 21.8 | 26.8 | 31 | 34.7 | 38 | 40.8 |
| | Ethanol | 33.5 | 35.4 | 37.1 | 38.5 | 39.7 | 40.7 | 41.5 | 42.3 |
| EtOH conversion rate (%) | Comparative Example | 1 | 2 | 3 | 4 | 5 | 6 | 7 | 8 |
| | | 90 | 100 | 100 | 100 | 95 | 84 | 60 | 50 |
| | Example | 1 | 2 | 3 | 4 | 5 | 6 | 7 | 8 |
| | | 93 | 100 | 100 | 100 | 97 | 87 | 68 | 61 |
| H selectivity (%) | Comparative Example | 1 | 2 | 3 | 4 | 5 | 6 | 7 | 8 |
| | | 90 | 100 | 110 | 105 | 87 | 60 | 50 | 43 |
| | Example | 1 | 2 | 3 | 4 | 5 | 6 | 7 | 8 |
| | | 98 | 103 | 115 | 110 | 91 | 68 | 60 | 60 |

As shown in Table 1, the fuel cells additionally including heteropoly acid according to Examples 1 to 8 turned out to have increased EtOH conversion rate and hydrogen selectivity, compared with the ones of Comparative Examples 1 to 8. In other words, the fuel cells of Examples 1 to 8 had more excellent ethanol reforming effects than the fuel cells of Comparative Example 1. In particular, they had very excellent capability of selectively reforming ethanol into hydrogen.

Experiment of Heteropoly Acid Effects

EXAMPLE 9

A polymer electrolyte membrane fuel cell system was fabricated according to the same method as in Example 5 except for including 0.0001 parts by weight of $H_3PW_{12}O_{40}$ heteropoly acid.

EXAMPLE 10

A polymer electrolyte membrane fuel cell system was fabricated according to the same method as in Example 5 except for including 0.0005 parts by weight of $H_3PW_{12}O_{40}$ heteropoly acid.

EXAMPLE 11

A polymer electrolyte membrane fuel cell system was fabricated according to the same method as in Example 5 except for including 0.001 parts by weight of $H_3PW_{12}O_{40}$ heteropoly acid.

EXAMPLE 12

A polymer electrolyte membrane fuel cell system was fabricated according to the same method as in Example 5 except for including 1 part by weight of $H_3PW_{12}O_{40}$ heteropoly acid.

EXAMPLE 13

A polymer electrolyte membrane fuel cell system was fabricated according to the same method as in Example 5 except for including 2 parts by weight of $H_3PW_{12}O_{40}$ heteropoly acid.

EXAMPLE 14

A polymer electrolyte membrane fuel cell system was fabricated according to the same method as in Example 5 except for including 5 parts by weight of $H_3PW_2O_{40}$ heteropoly acid.

Then, the ethanol conversion rate and hydrogen selectivity of the polymer electrolyte membrane fuel cell systems according to Examples 9 to 14 were measured. The results are shown in the following Table 2. In addition, the result of Comparative Example 1 is shown in the following Table 2 for comparison.

TABLE 2

| | Comp. Ex. 1 | Example 9 | Example 10 | Example 11 | Example 12 | Example 13 | Example 14 |
|---|---|---|---|---|---|---|---|
| HPA addition parts by weight | 0 | 0.0001 | 0.0005 | 0.001 | 1 | 2 | 5 |
| ethanol conversion rate (%) | 95 | 95 | 96 | 97 | 99 | 97 | 95 |
| H selectivity (%) | 87 | 88 | 88 | 91 | 100 | 90 | 88 |

As shown in Table 2, the ones including heteropoly acid according to Examples 9 to 14 had better conversion rate and hydrogen selectivity than the one of Comparative Example 1. When they included heteropoly acid in an amount of 0.001 to 2 parts by weight, they had very excellent effects.

Stability Experiment According to Addition of Heteropoly Acid

Sample 1 is prepared by mixing 41.1 wt % of $H_2O_2$, 37.1 wt % of ethanol (C/O 0.8), and 21.8 wt % of water.

Sample 2 is prepared by mixing 34.7 wt % of $H_2O_2$, 38.5 wt % of ethanol (C/O 0.8), and 26.8 wt % of water (C/O 0.7).

Sample 3 is prepared by adding 0.001 parts by weight of $H_3PW_{12}O_{40}$ heteropoly to 100 parts by weight of Sample 1.

In addition, the Samples 1 to 3 were all frozen at −25° C.

In other words, since the water used for operating a reformer at a low temperature was frozen, the operation of a polymer electrolyte membrane fuel cell system including the same could not work. However, when it included hydrogen peroxide, it could lower a melting point, and therefore make a polymer electrolyte membrane fuel cell system work. Likewise, when heteropoly acid as well as hydrogen peroxide was included, the hydrogen peroxide brought the same effect. In other words, the heteropoly acid did not increase a melting point.

In addition, the concentration change of hydrogen peroxide was measured while increasing a temperature of Samples 1 to 4 from 20° C. to 88° C. The result is shown in the following Table 3. In the following Table 3, the values of Samples 1 to 4 indicates wt % of hydrogen peroxide. The aging time indicates retention time how long they may maintain at a measuring temperature after they reached there.

TABLE 3

| | Temperature (° C.) | | | | | | | |
|---|---|---|---|---|---|---|---|---|
| | 20 | 30 | 40 | 50 | 60 | 70 | 80 | 88 |
| Sample 1 | 41.4 | 41.4 | 39.7 | 37.4 | 33.6 | 30.9 | 27.3 | 16.1 |
| Sample 3 | 41.4 | 41.4 | 41.4 | 41.4 | 41.4 | 41.1 | 40.5 | 39.5 |
| Sample 2 | 34.7 | 34.7 | 33.0 | 31.0 | 28.5 | 25.4 | 28.2 | 15.4 |
| Sample 4 | 34.7 | 34.7 | 34.7 | 34.7 | 34.7 | 34.3 | 34.0 | 33.3 |
| Aging time (min) | 10 | 109 | 102 | 100 | 95 | 93 | 90 | 100 |

As shown in Table 3, Samples 3 and 4 including heteropoly acid maintained a concentration, that is, wt % at a high temperature like at a low temperature, so that hydrogen peroxide therein was not decomposed but remained.

Accordingly, when heteropoly acid was added to Samples 3 and 4, it could remove a chance of explosion due to decomposition of hydrogen peroxide, improving stability.

As described above, the fuel composition for a fuel cell for a polymer electrolyte membrane fuel cell includes $H_2O_2$ and heteropoly acid as well as a fuel, which may reduce a reforming reaction temperature and also hydrogen generating efficiency and resultantly provides a high power cell.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A fuel composition for a polymer electrolyte membrane fuel cell, comprising:
   a fuel;
   water;
   heteropoly acid; and
   hydrogen peroxide ($H_2O_2$), the hydrogen peroxide being present in an amount of 10 wt % to 60 wt % based on the weight of the mixture of the fuel, the water, the hydrogen peroxide, and the heteropoly acid, and wherein the heteropoly acid is present in an amount of 0.001 parts to 2 parts based on 100 parts by weight of a mixture of the fuel, water and $H_2O_2$.

2. The composition of claim 1, wherein the $H_2O_2$ is present in an amount of 25 wt % to 35 wt % based on the weight of the mixture of the fuel, the water, the hydrogen peroxide, and the heteropoly acid.

3. The composition of claim 1, wherein the $H_2O_2$ is present in an amount that is determined by that a ratio of a number of carbon of the fuel to a number of oxygen generated from hydrogen peroxide is 0.2 to 1.2.

4. The composition of claim 3, wherein the $H_2O_2$ is present in an amount that is determined by that a ratio of a number of carbon of the fuel to a number of oxygen generated from hydrogen peroxide is 0.5 to 0.8.

5. The composition of claim 1, wherein the fuel is a hydrocarbon fuel.

6. The composition of claim 1, wherein the heteropoly acid comprises a compound including at least one anion selected from the group consisting of $[PMo_{12}O_{40}]^{3-}$, $[PW_{12}O_{40}]^{3-}$, $[GeMo_{12}O_{40}]^{4-}$, $[GeW_{12}O_{40}]^{4-}$, $[P_2W_{18}O_{62}]^{6-}$, $[SiW_{12}O_{40}]^{4-}$, $[PMo_{11}O_{39}]^{7-}$, $[P_2Mo_5O_{23}]^{6-}$, $[H_2W_{12}O_{40}]^{6-}$, $[PW_{11}O_{39}]^{7-}$, and combinations thereof.

7. The composition of claim 1, wherein the heteropoly acid is present in an amount of 0.001 parts to 1 part by weight based on 100 parts by weight of a mixture of the fuel, water, and $H_2O_2$.

8. A polymer electrolyte membrane fuel cell system, comprising:
   a fuel supplier for supplying a fuel composition that includes a fuel, water, hydrogen peroxide ($H_2O_2$), and heteropoly acid, wherein the hydrogen peroxide is present in an amount of 10 wt % to 60 wt % based on the weight of the mixture of the fuel, the water, the hydrogen peroxide, and the heteropoly acid, and the heteropoly acid is present in an amount of 0.001 parts to 2 parts based on 100 parts by weight of a mixture of the fuel, water and $H_2O_2$;
   a reformer that reforms the fuel composition supplied from the fuel supplier to generate hydrogen gas;
   an oxidant supplier for supplying an oxidant; and
   an electricity generating element for generating electricity through electrochemical reactions of the hydrogen gas supplied from the reformer and the oxidant supplied from the oxidant supplier, the electricity generating element comprising:
      a membrane-electrode assembly comprising:
         an anode and a cathode facing each other;
         a polymer electrolyte membrane interposed between the anode and the cathode; and
      a separator.

9. The polymer electrolyte membrane fuel cell system of claim 8, wherein the $H_2O_2$ is present in an amount of 25 wt % to 35 wt % based on the weight of the mixture of the fuel, the water, the hydrogen peroxide, and the heteropoly acid.

10. The polymer electrolyte membrane fuel cell system of claim 8, wherein the $H_2O_2$ is present in an amount that is determined by that a ratio of a number of carbon of the fuel to a number of oxygen generated from hydrogen peroxide is 0.2 to 1.2.

11. The polymer electrolyte membrane fuel cell system of claim 10, wherein the $H_2O_2$ is present in an amount that is determined by that a ratio of a number of carbon of the fuel to a number of oxygen generated from hydrogen peroxide is 0.5 to 0.8.

12. The polymer electrolyte membrane fuel cell system of claim 8, wherein the fuel is a hydrocarbon fuel.

13. The polymer electrolyte membrane fuel cell system of claim 8, wherein the heteropoly acid comprises a compound including at least one anion selected from the group consisting of $[PMo_{12}O_{40}]^{3-}$, $[PW_{12}O_{40}]^{3-}$, $[GeMo_{12}O_{40}]^{4-}$, $[GeW_{12}O_{40}]^{4-}$, $[P_2W_{18}O_{62}]^{6-}$, $[SiW_{12}O_{40}]^{4-}$, $[PMo_{11}O_{39}]^{7-}$, $[P_2Mo_5O_{23}]^{6-}$, $[H_2W_{12}O_{40}]^{6-}$, $[PW_{11}O_{39}]^{7-}$, and combinations thereof.

14. The polymer electrolyte membrane fuel cell system of claim 8, wherein the heteropoly acid is present in an amount of 0.001 parts to 1 part by weight based on 100 parts by weight of a mixture of the fuel, water, and $H_2O_2$.

* * * * *